(12) United States Patent
Fukaya et al.

(10) Patent No.: US 12,360,077 B2
(45) Date of Patent: Jul. 15, 2025

(54) AUTOMATIC ANALYSIS DEVICE AND AUTOMATIC ANALYSIS METHOD OF SPECIMEN

(71) Applicant: HITACHI HIGH-TECH CORPORATION, Tokyo (JP)

(72) Inventors: Masashi Fukaya, Tokyo (JP); Akihiro Yasui, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 711 days.

(21) Appl. No.: 17/627,240

(22) PCT Filed: Mar. 11, 2020

(86) PCT No.: PCT/JP2020/010581
§ 371 (c)(1),
(2) Date: Jan. 14, 2022

(87) PCT Pub. No.: WO2021/014674
PCT Pub. Date: Jan. 28, 2021

(65) Prior Publication Data
US 2022/0236213 A1    Jul. 28, 2022

(30) Foreign Application Priority Data
Jul. 22, 2019   (JP) .................. 2019-134304

(51) Int. Cl.
  *G01N 27/416*  (2006.01)
  *G01N 27/30*  (2006.01)
  *G01N 27/38*  (2006.01)

(52) U.S. Cl.
  CPC ......... *G01N 27/416* (2013.01); *G01N 27/301* (2013.01); *G01N 27/38* (2013.01)

(58) Field of Classification Search
  CPC ............ G01N 27/416; G01N 27/4161; G01N 27/4163–4167; G01N 27/333
  See application file for complete search history.

(56) References Cited

U.S. PATENT DOCUMENTS

| 5,288,374 A | 2/1994 | Watanabe et al. |
| 2014/0363896 A1 | 12/2014 | Suzuki et al. |
| 2016/0334358 A1* | 11/2016 | Kishioka .............. G01N 27/333 |

FOREIGN PATENT DOCUMENTS

| JP | 63-32367 A | 2/1988 | |
| JP | 012822459 A * | 11/1989 | ............. G01N 17/36 |

(Continued)

OTHER PUBLICATIONS

EPO machine-generated English language translation of Seiji Yamaguchi JP 01282459 A, patented Nov. 14, 1989 (Year: 1989).*

(Continued)

*Primary Examiner* — Alexander S Noguerola
(74) *Attorney, Agent, or Firm* — MATTINGLY & MALUR, PC

(57) ABSTRACT

An automatic analysis device 100 includes an electrolyte measurement unit 114 that executes internal standard solution measurement once or more at least before potential measurement of the specimen, and when the potential measurement of the specimen is continuously executed by the electrolyte measurement unit 114, a measurement operation of the internal standard solution before the potential measurement is changed depending on whether there is a possibility that the specimen measured immediately before is a high concentration specimen. This provides an automatic analysis device and an automatic analysis method of a specimen that are capable of improving the processing capacity of the entire device by reducing the carry-over and ensuring measurement accuracy in performing electrolyte measurement.

9 Claims, 14 Drawing Sheets

(56) References Cited

FOREIGN PATENT DOCUMENTS

| JP | 03-100455 A | 4/1991 |
| JP | 04-84770 A | 3/1992 |
| JP | 2010-175275 A | 8/2010 |
| JP | 2014-041060 A | 3/2014 |
| JP | 2016-085086 A | 5/2016 |
| JP | 2018-004388 A | 1/2018 |
| WO | 2013/099660 A1 | 7/2013 |

OTHER PUBLICATIONS

WIPO Englsih language translation of the Written Opinion for international application No. PCT/JP2020/010581, mailed Jun. 9, 2020 (Year: 220).*
EPO machine-generated English language translation of WO 2013/099660 A1, published Apr. 7, 2013 (Year: 2013).*
International Search Report of PCT/JP2020/010581 dated Jun. 9, 2020.

* cited by examiner

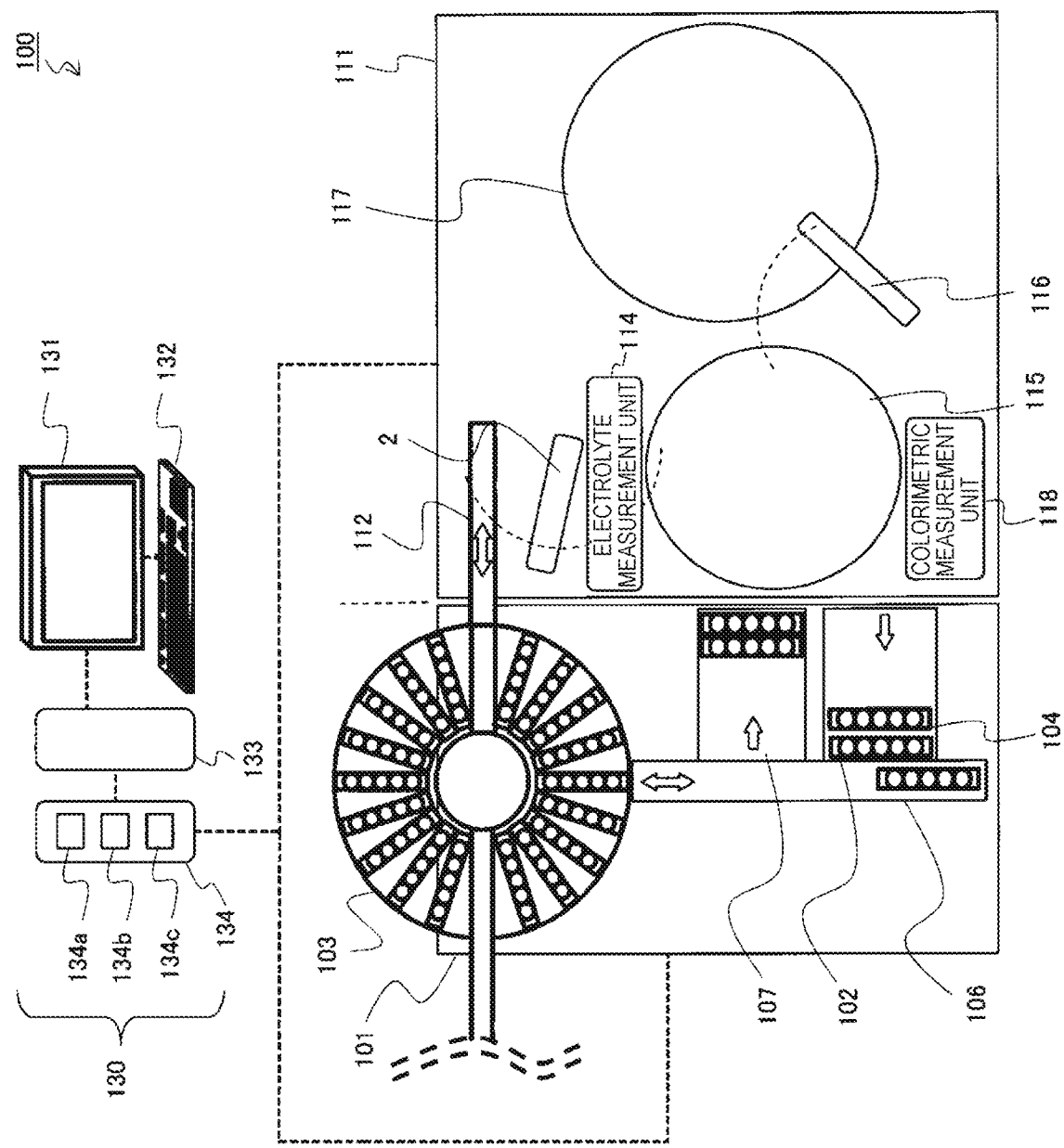
[FIG. 1]

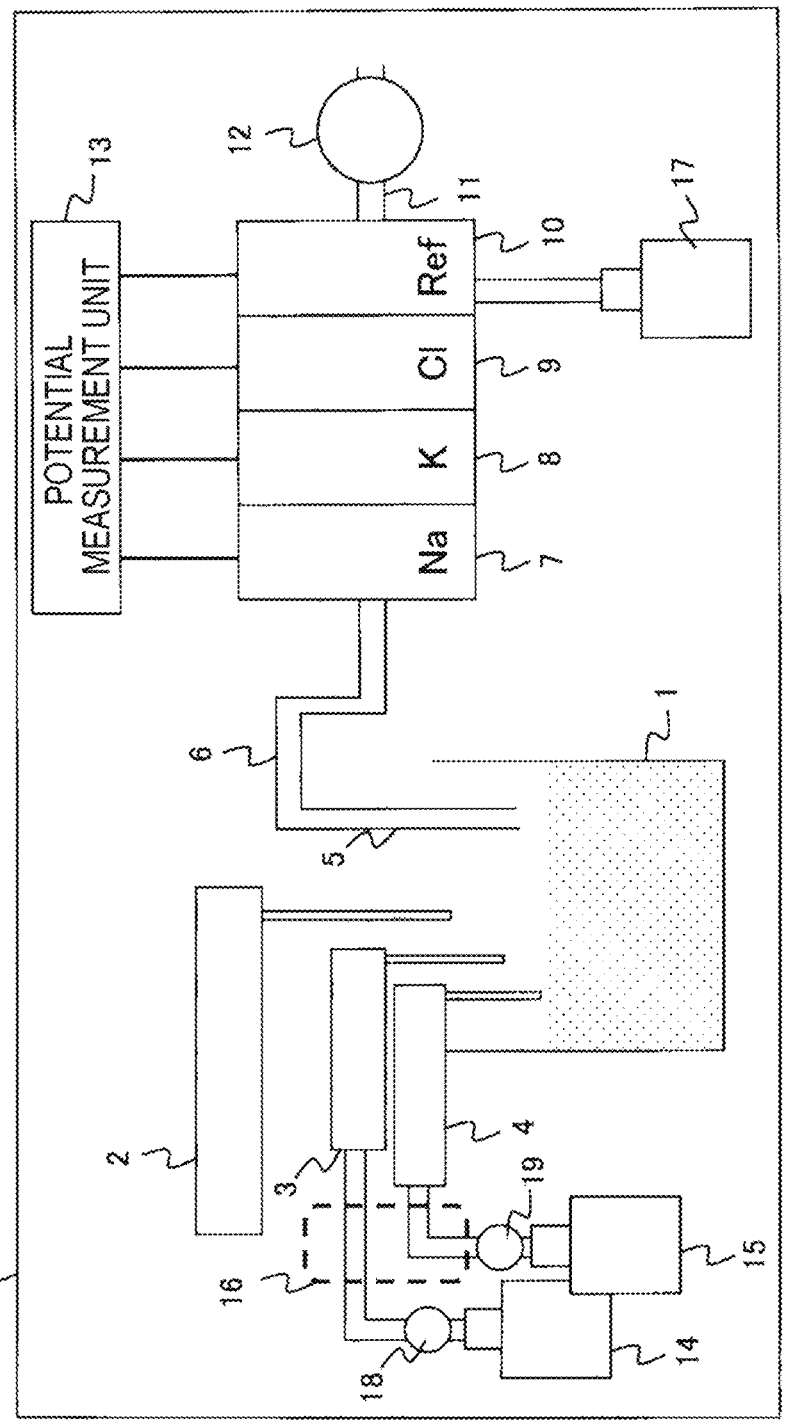
[FIG. 2]

[FIG. 3]
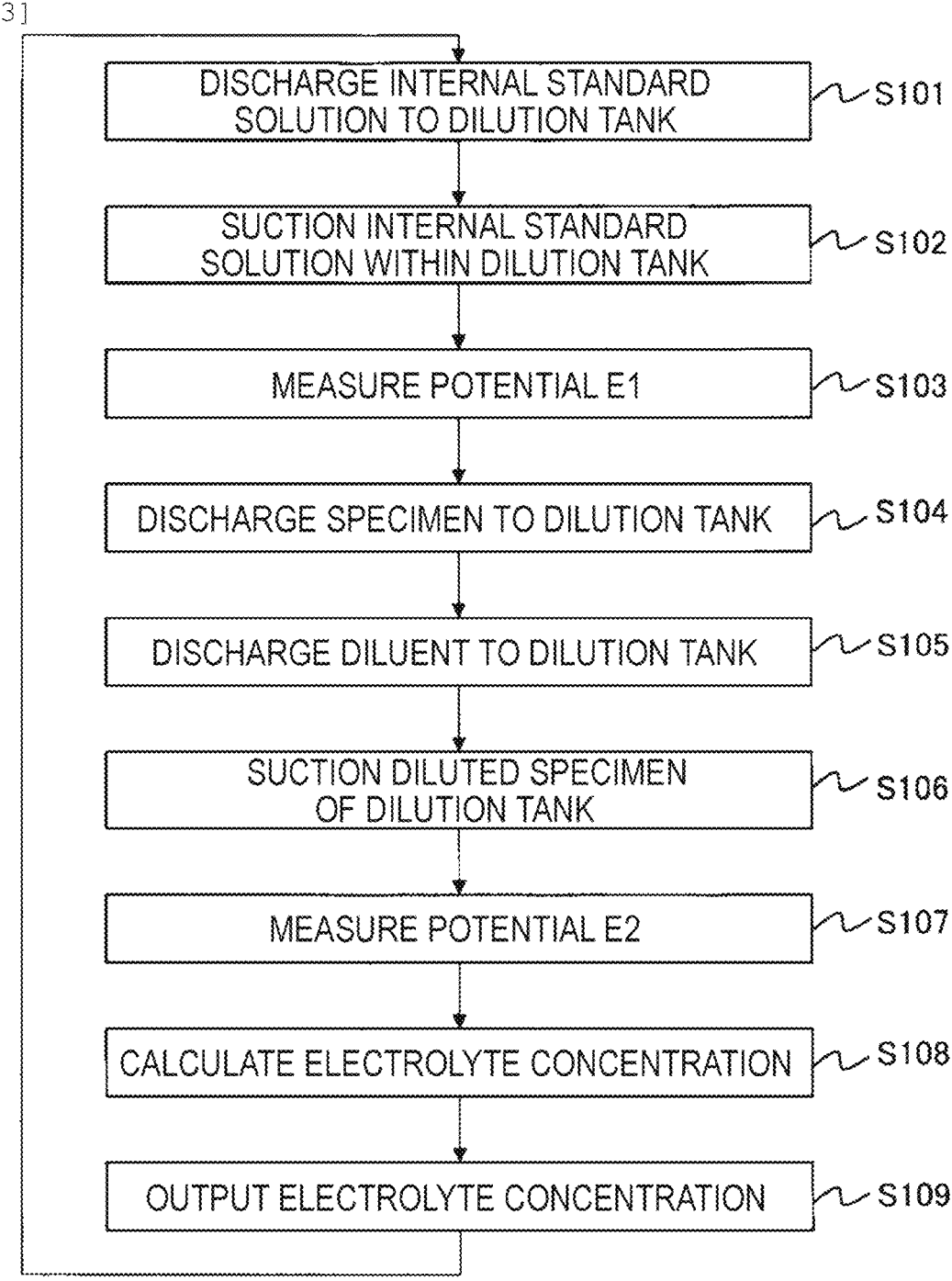

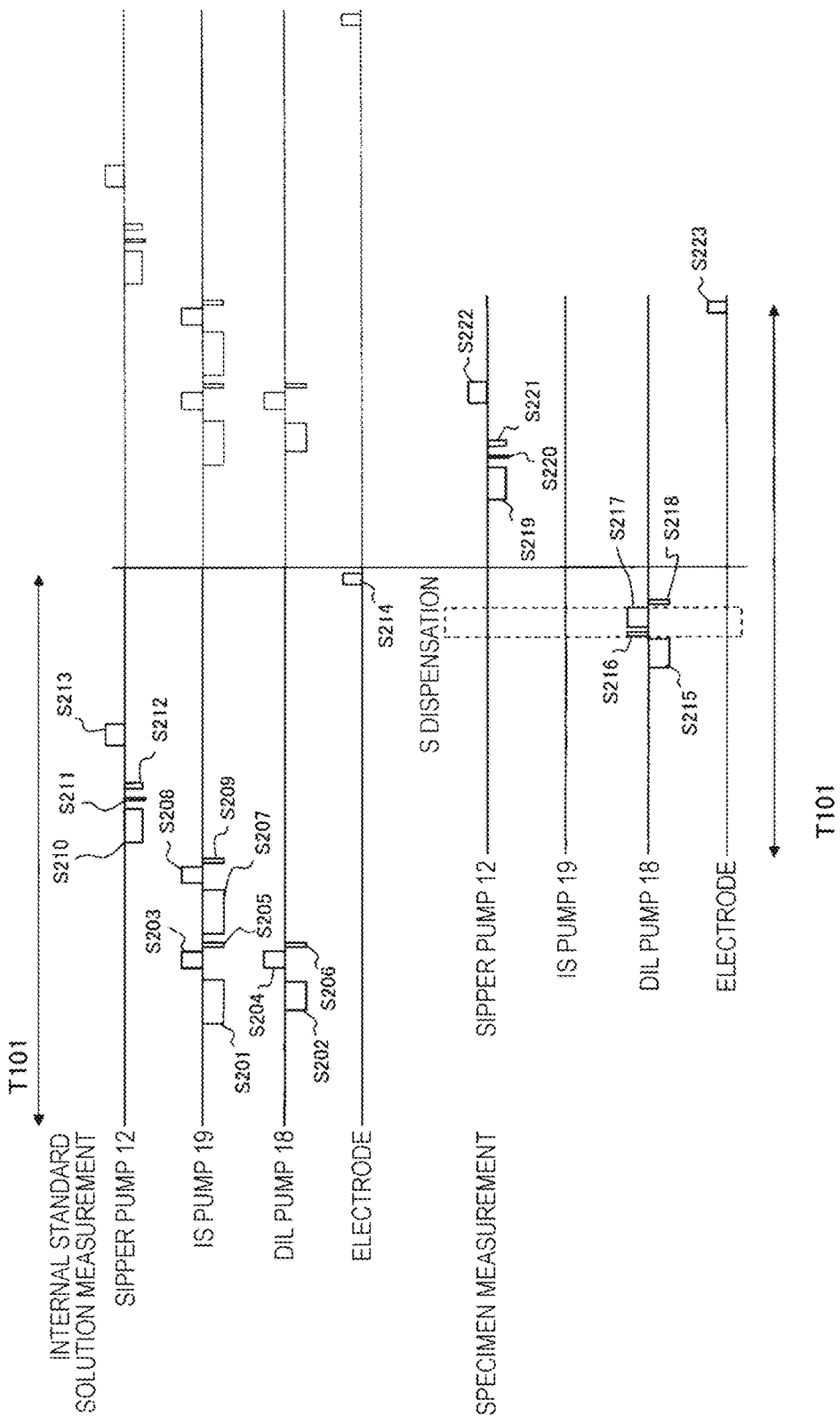
[FIG. 4]

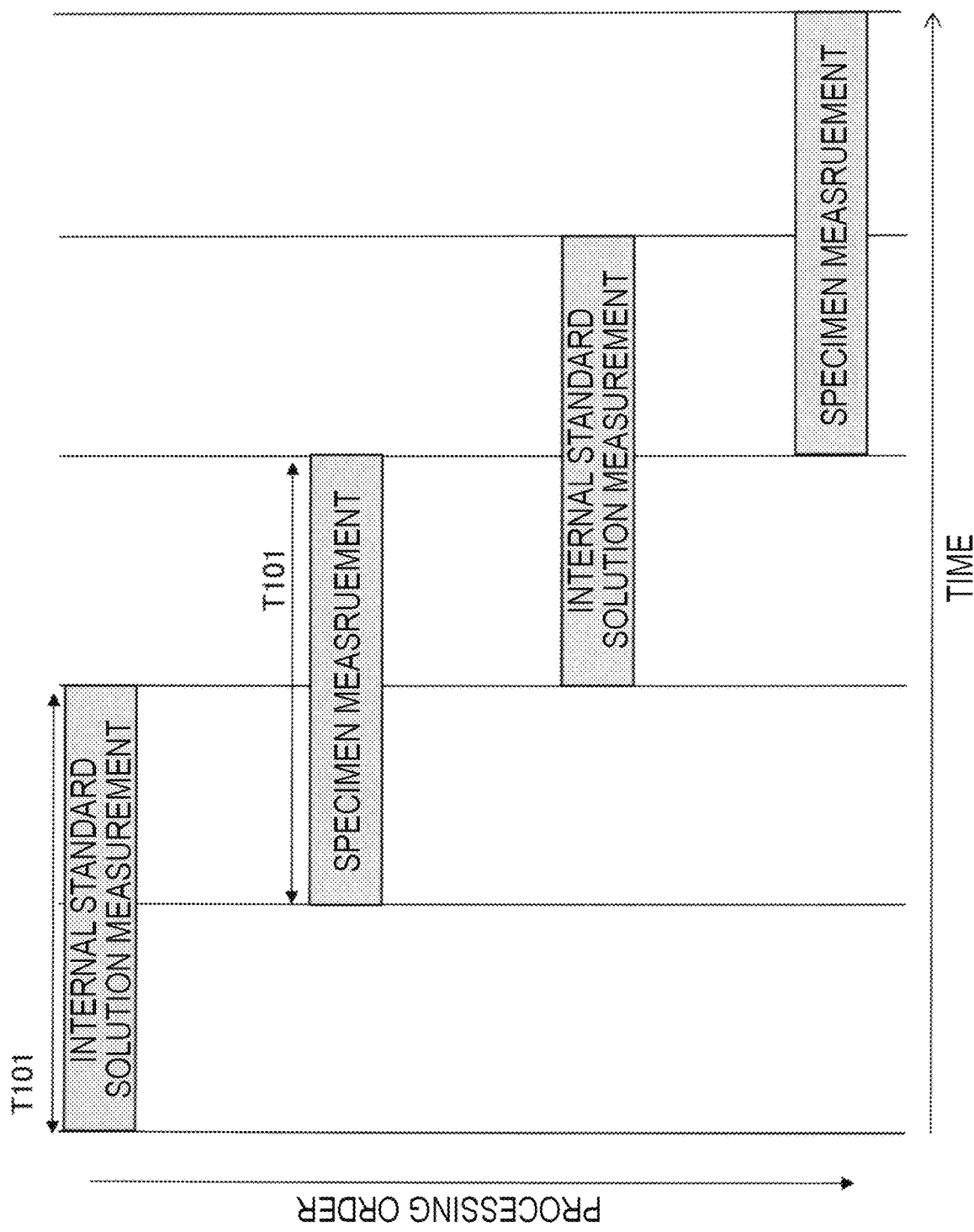
[FIG. 5]

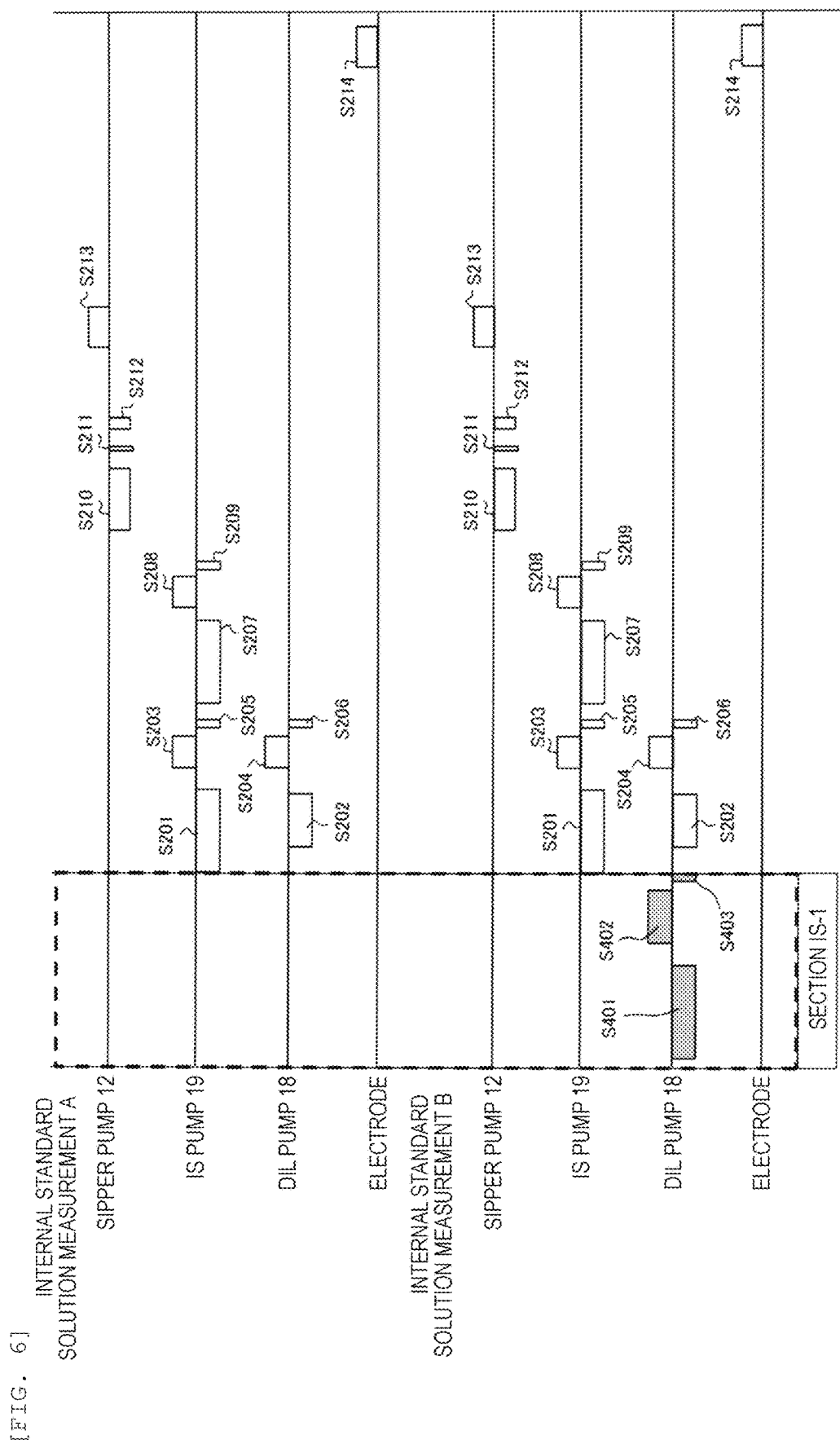

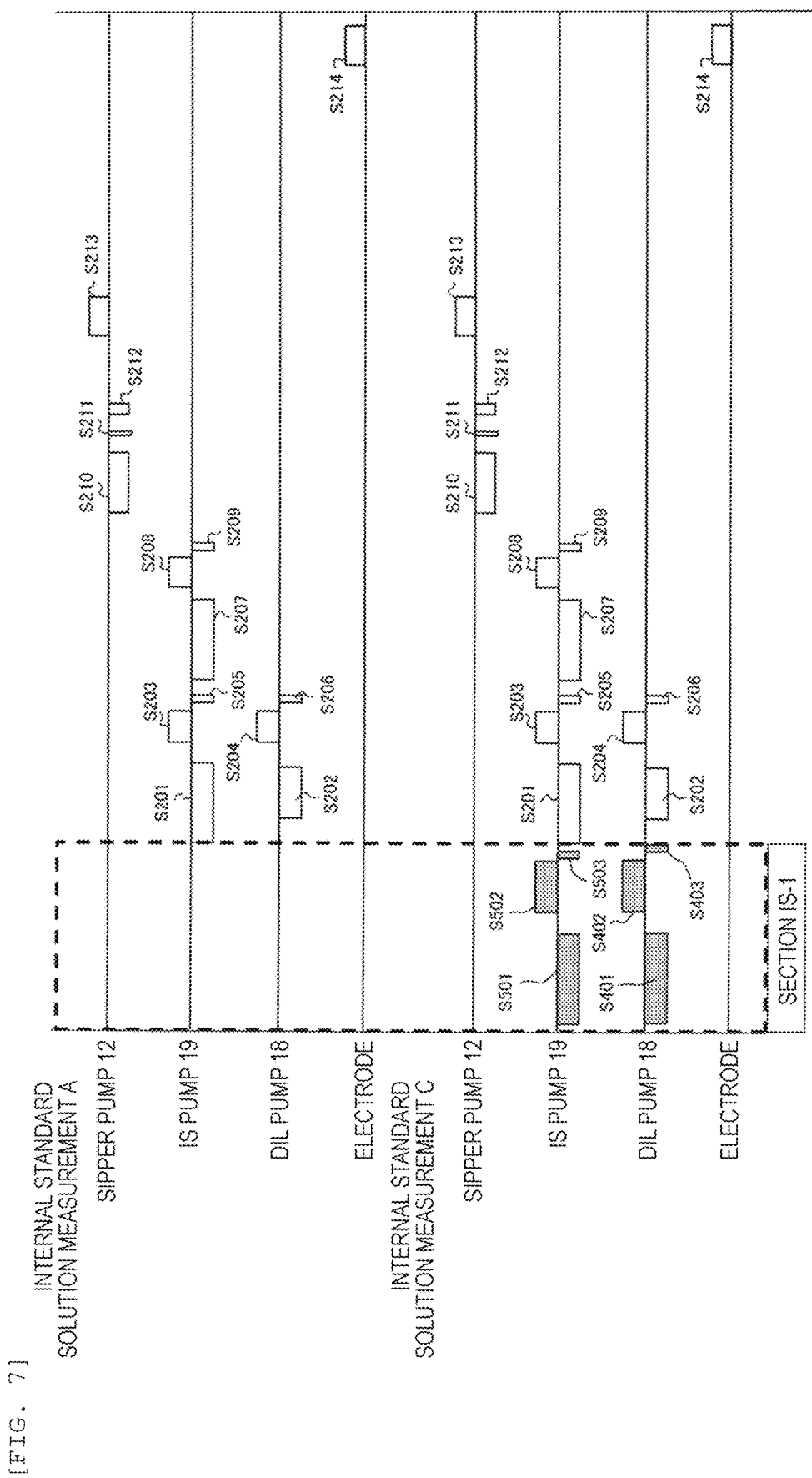
[FIG. 7]

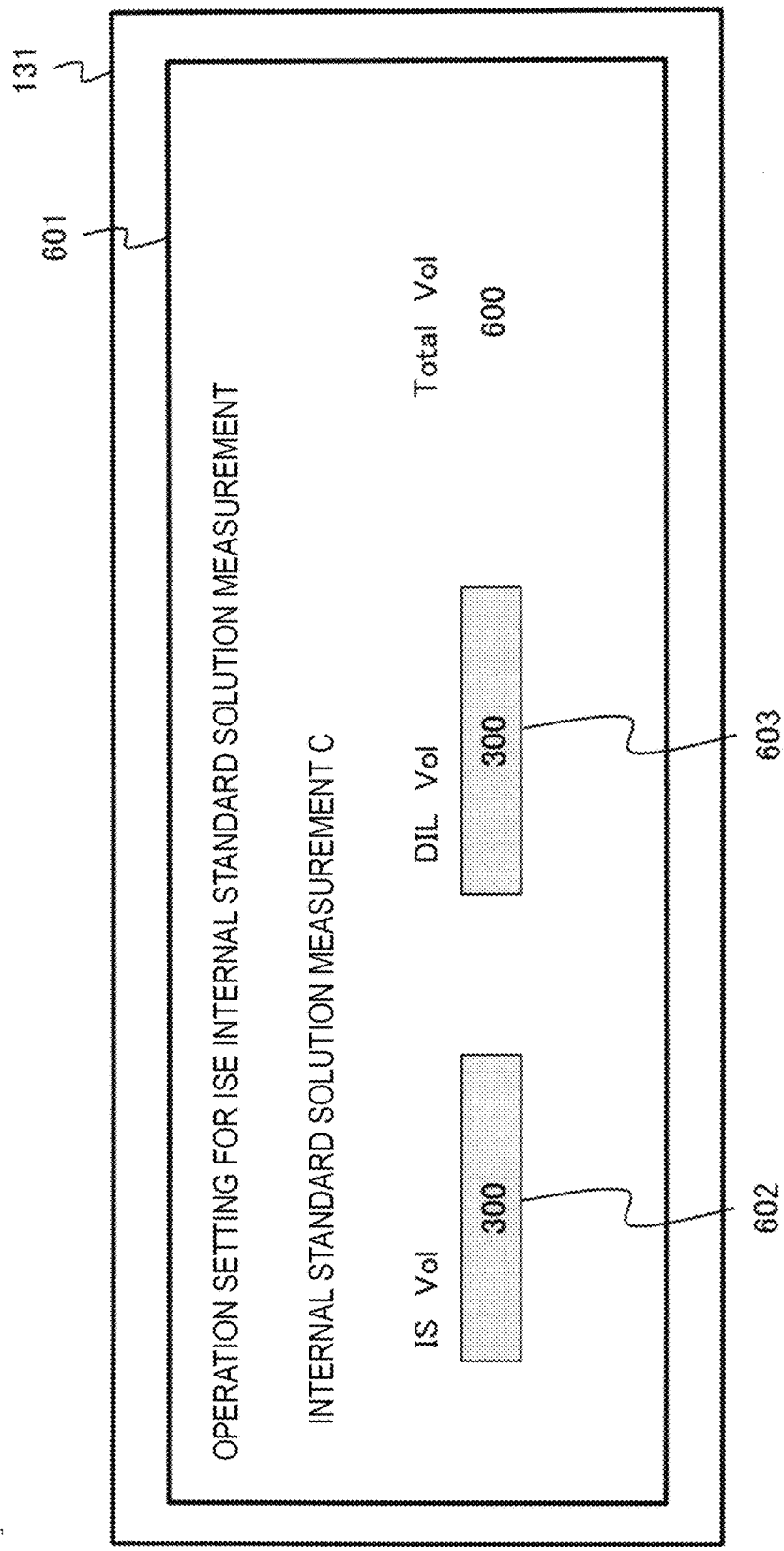
[FIG. 8]

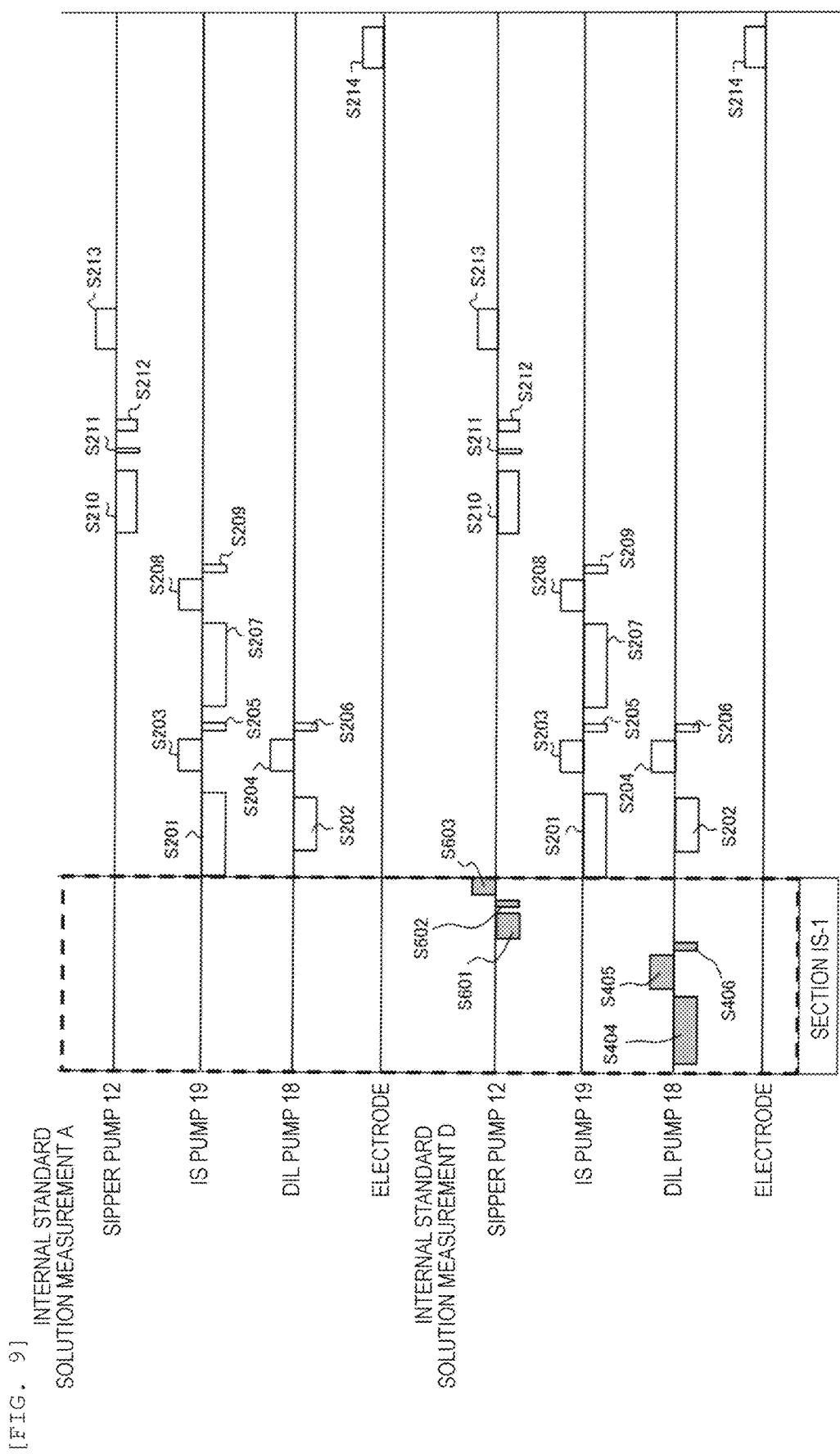

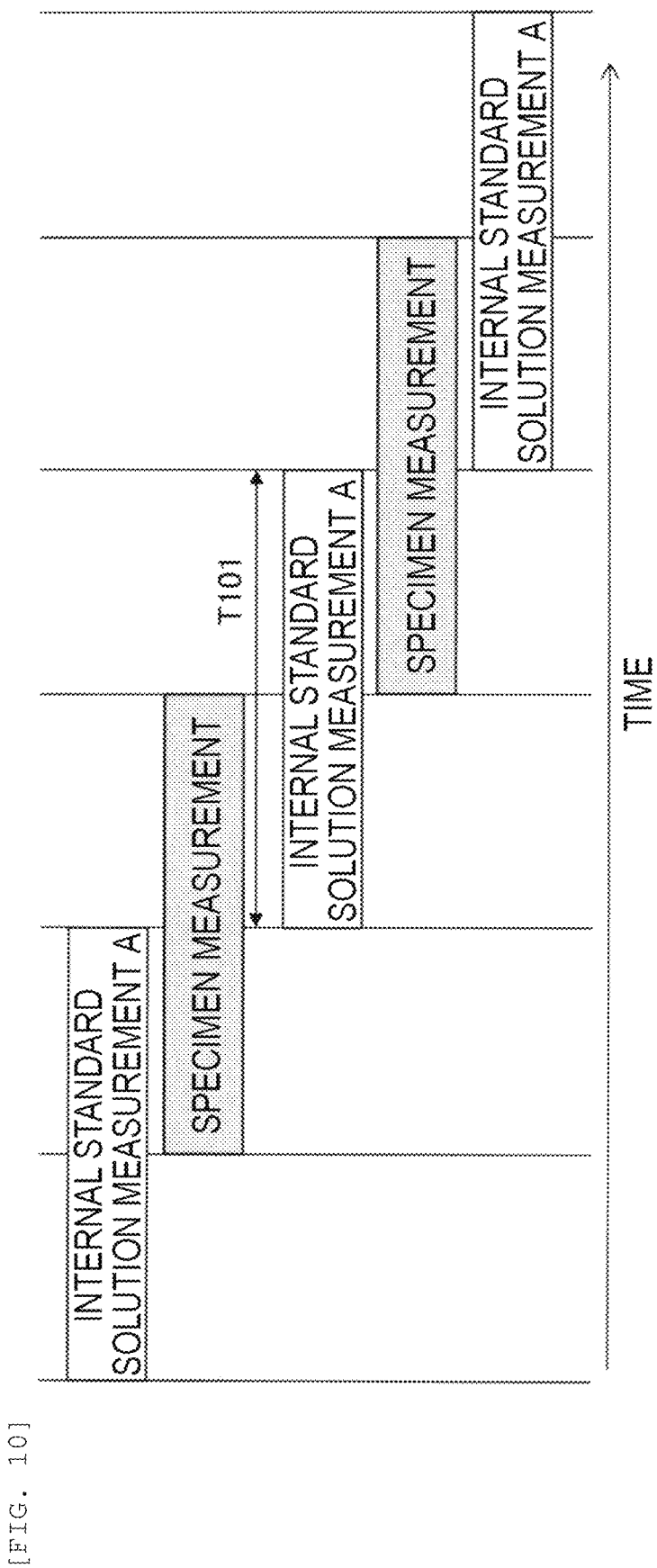
[FIG. 10]

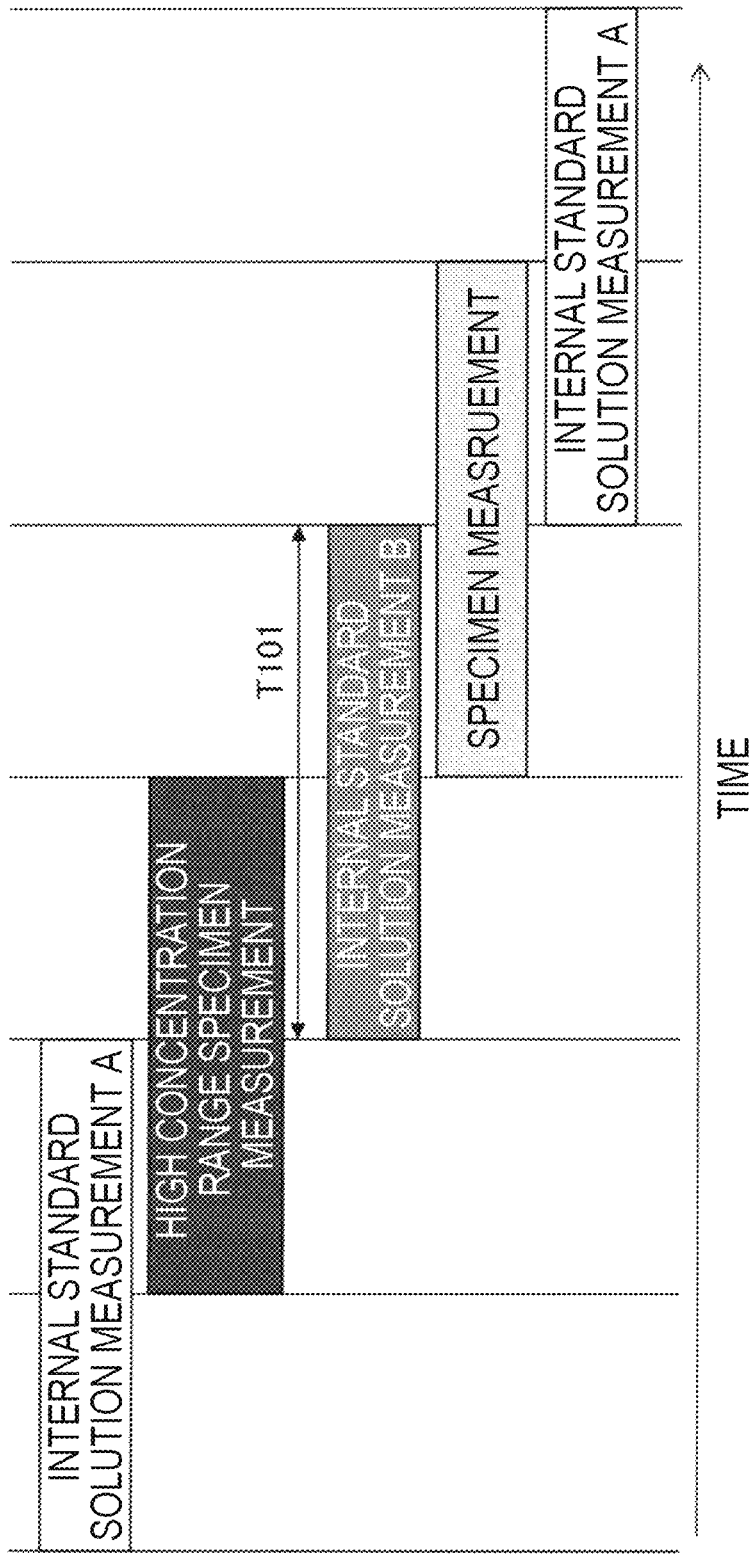
[FIG. 11]

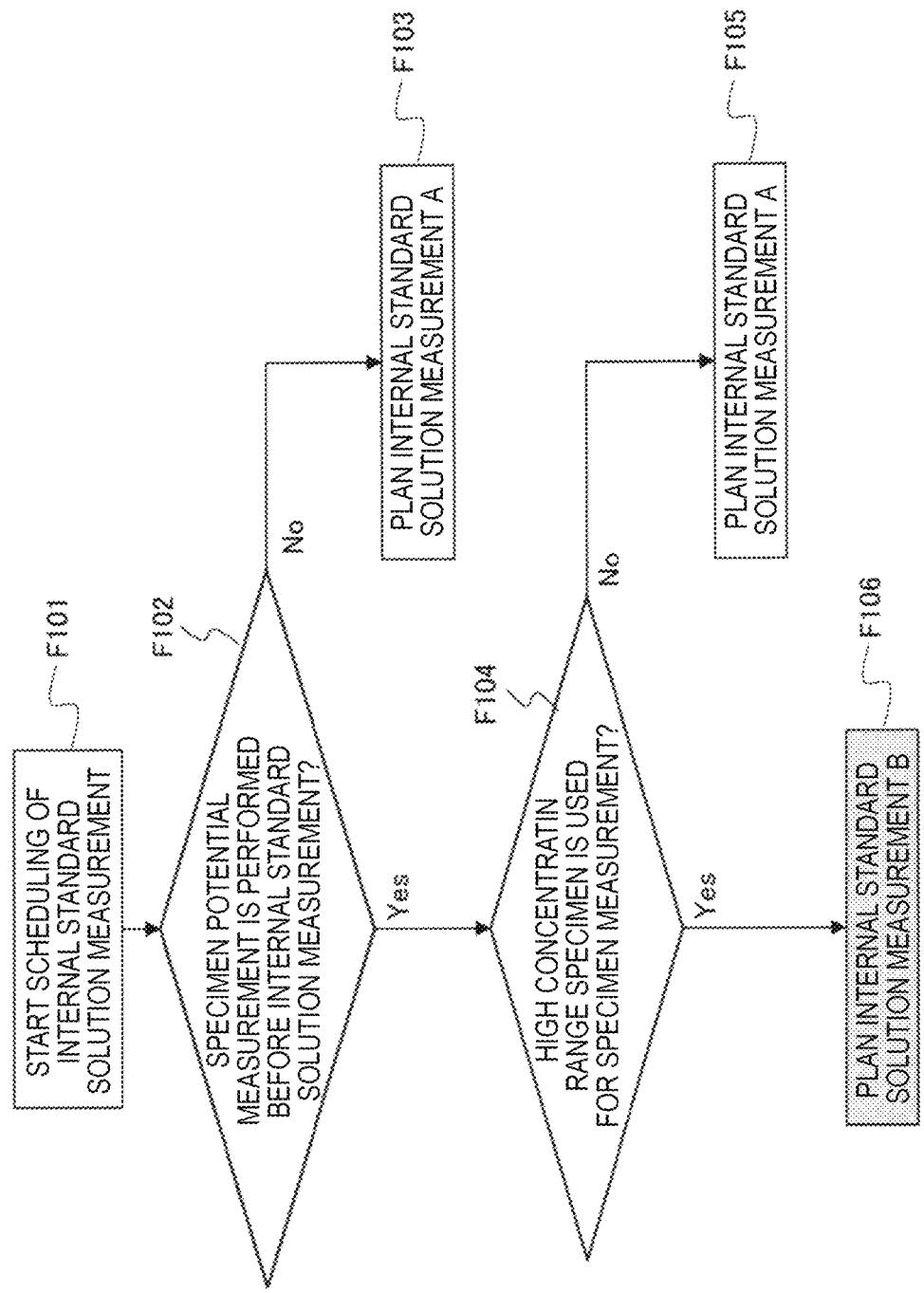
[FIG. 12]

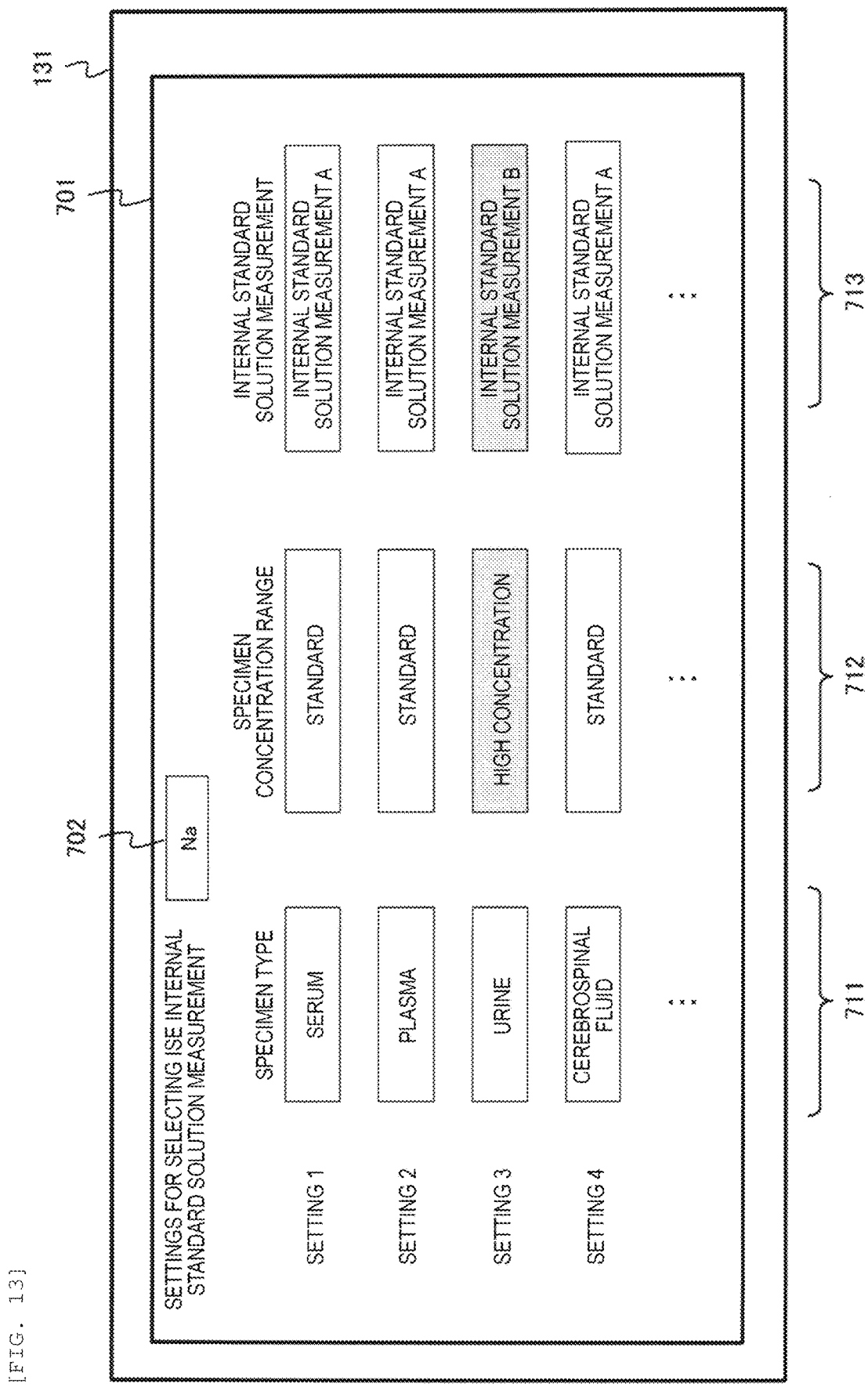
[FIG. 13]

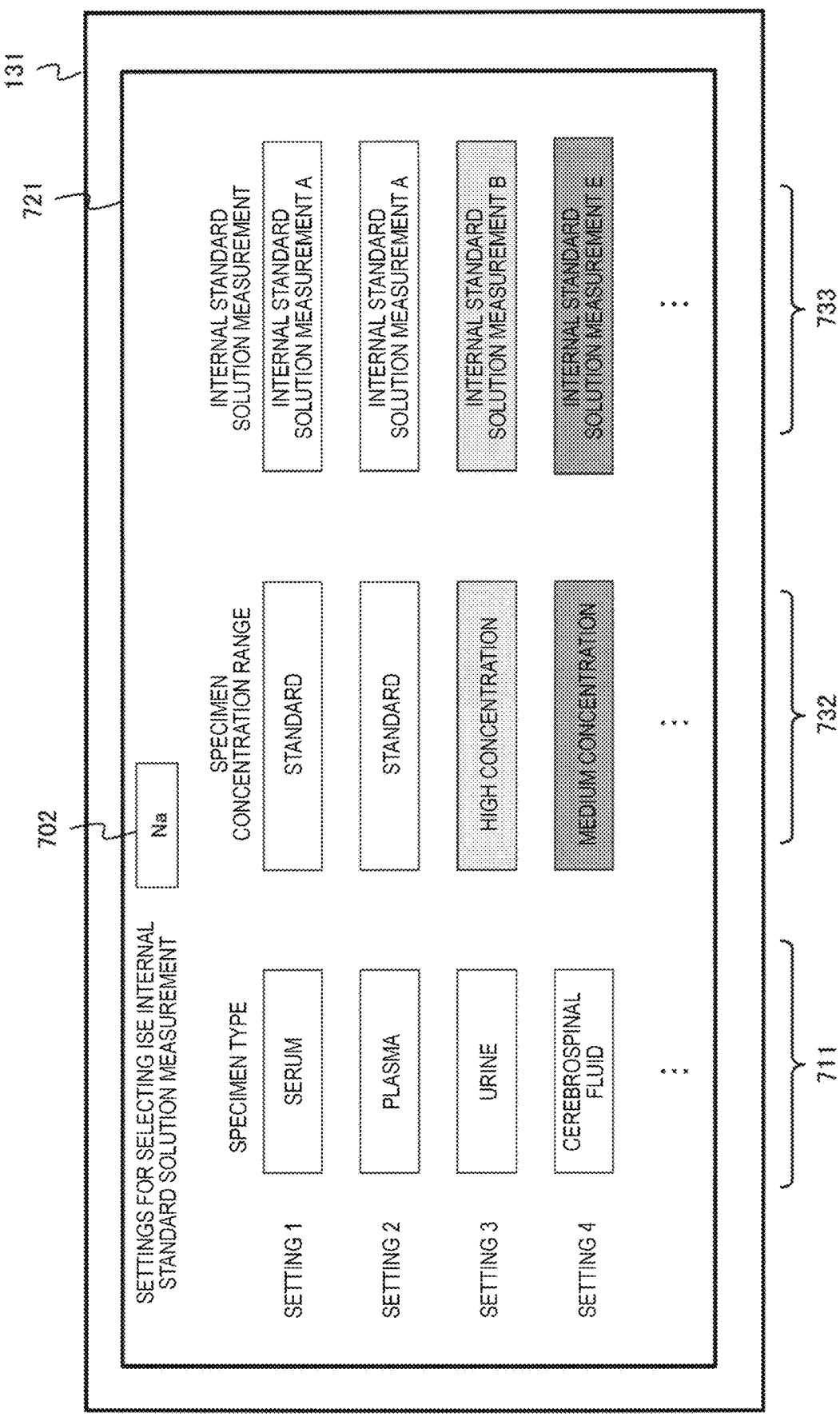

AUTOMATIC ANALYSIS DEVICE AND AUTOMATIC ANALYSIS METHOD OF SPECIMEN

TECHNICAL FIELD

The present invention relates to an automatic analysis device for measuring the concentration or activity value of a target component in a biological specimen such as blood or urine and an automatic analysis method of a specimen, and in particular, an automatic analysis device equipped with an electrolyte analysis unit based on an ion selective electrode and an automatic analysis method of a specimen.

BACKGROUND ART

As an example of an automatic analysis device that achieves both a small amount of specimen liquid and high measurement accuracy, PTL 1 describes one that includes an electrolyte sensor, a dilution tank having an inner wall that slopes monotonically toward the dot-like deepest part, a first tube for sending the specimen solution from the dilution tank to the electrolyte sensor, and a second tube for draining the specimen solution from the dilution tank to the outside, in which both one end of the first tube and one end of the second tube can be disposed near the deepest part of the dilution tank.

CITATION LIST

Patent Literature

PTL 1: JP-A-2018-004388

SUMMARY OF INVENTION

Technical Problem

The automatic analysis device is a device that analyzes biological specimens such as blood, urine, and cerebrospinal fluid.

In such an automatic analysis device, when measuring the concentration of an electrolyte (ions such as Na, K, Cl, etc.) in a specimen, a flow type electrolyte concentration measuring device using an ion selective electrode (ISE) is used as a typical method.

In clinical tests using an electrolyte concentration measuring device, it is highly necessary to quantify the concentration of electrolytes contained in blood, which is a biological specimen, especially specimens such as serum, plasma, and urine, and high precision is required for the measurement data.

There is a dilution method as one of the electrolyte measurements. The dilution method has the advantage that the amount of specimen consumed is small because the amount of specimen liquid required is small. In addition, the dilution method has many other advantages such as low concentration of coexisting substances such as proteins and lipids in the measuring solution, less influence of stains by coexisting substances, and high ISE stability.

Therefore, the combination of the flow cell type ISE and the dilution method is currently the mainstream in the automatic electrolyte analysis device.

A container called a dilution tank is used to dilute the specimen in the automatic electrolyte analysis device. Further, the diluted specimen prepared in the dilution tank is sent to the flow cell type ISE through a pipe and measured.

The internal standard solution is dispensed into the dilution tank alternately with the specimen and measured alternately with the specimen. The operation related to the measurement is performed according to a predetermined operation cycle time.

In the ISE measurement, not only the potential of the specimen but also the potential of the internal standard solution is used to determine the electrolyte concentration of the specimen solution. This is because it is common to use the difference between the potential of the specimen and the potential of the internal standard solution for the concentration calculation.

In this way, during the flow type electrolyte measurement, the specimen and the internal standard solution alternately flow in the flow path.

Here, if the electrolyte concentration of the specimen is higher than that of the internal standard solution, since the specimen component previously measured is carried over to the internal standard solution drawn into the flow path for measurement, the potential of the internal standard solution may fluctuate from the value to be obtained.

That is, if the fluctuating potential of the internal standard solution is used in the next specimen measurement, the potential difference between the specimen and the internal standard solution becomes smaller than the original value, and the specimen concentration calculation value is calculated to be small. That is, there is a risk that the linearity of the measured value in the high concentration region cannot be obtained due to this phenomenon.

Suppressing the carry-over between the specimen and the internal standard solution affects the reproducibility and measurable range of ISE, and thus, it is a problem that needs to be solved in order to maintain and improve ISE measurement performance.

In response to such a problem, the technique described in JP-A-2018-004388 (PTL 1) described above aims at reducing the amount of the specimen to be measured and reducing the carry-over by adjusting the shape of the ISE dilution tank and the arrangement of the respective discharge and suction nozzles.

However, in the technique described in PTL 1 described above, although the shape and arrangement are devised, there are various factors such as nozzle position adjustment and specimen liquid property, the studies by the present inventors have clarified that there is room to reduce the amount of residual liquid in a stable manner and reduce carry-over more effectively and that there is room to prevent the accumulation of stains when the dilution tank is used for a long period of time.

Here, a method of reducing the carry-over amount can be considered by interposing the cleaning between the specimen measurement and the internal standard solution. The cleaning in ISE includes an operation to flow not only detergent but also a reagent as a dummy into the dilution tank and the flow path and co-wash the dilution tank and the flow path.

However, since the potential of the internal standard solution before and after specimen measurement is generally used for specimen concentration calculation, if the cleaning process is always sandwiched due to the high concentration of the immediately preceding specimen, there is a problem that the processing capacity will be reduced by that amount.

An object of the present invention is to provide an automatic analysis device and an automatic analysis method of a specimen capable of reducing carry-over to ensure measurement accuracy and improving the processing capacity of the entire device when measuring an electrolyte.

Solution to Problem

The present invention includes a plurality of means for solving the above problems, and an example thereof is an automatic analysis device that automatically analyzes a specimen, which includes an electrolyte measurement unit that executes the measurement of an internal standard solution one or more times at least before potential measurement of the specimen, and in which a measurement operation of the internal standard solution before the potential measurement is changed without changing the length of the cycle itself, depending on whether there is a possibility that the specimen measured immediately before is a high concentration specimen when the potential measurement of the specimen is continuously executed by the electrolyte measurement unit.

Advantageous Effects of Invention

According to the present invention, when performing electrolyte measurement, carry-over can be reduced to ensure measurement accuracy, and the processing capacity of the entire device can be improved. Problems, configurations, and effects other than those mentioned above will be clarified by the description of the following examples.

BRIEF DESCRIPTION OF DRAWINGS

FIG. 1 is a diagram schematically illustrating the overall configuration of an automatic analysis device according to an example of the present invention.

FIG. 2 is a diagram schematically illustrating an electrolyte measurement unit in the automatic analysis device of the example.

FIG. 3 is a flowchart illustrating a flow of measuring an electrolyte concentration by the electrolyte measurement unit of the automatic analysis device of the example.

FIG. 4 is a diagram schematically illustrating operation time charts of internal standard solution measurement and specimen measurement at the time of continuous measurement in the electrolyte measurement unit of the automatic analysis device of the example.

FIG. 5 is a diagram schematically illustrating a series of processing orders of internal standard solution measurement and specimen measurement at the time of continuous measurement in the electrolyte measurement unit of the automatic analysis device of the example.

FIG. 6 is a diagram illustrating two internal standard solution measurement sequences in the electrolyte measurement unit of the automatic analysis device of the example.

FIG. 7 is a diagram illustrating another internal standard solution measurement sequence in the electrolyte measurement unit of the automatic analysis device of the example.

FIG. 8 is a diagram illustrating an example of an operation setting screen for the internal standard solution sequence in the automatic analysis device of the example.

FIG. 9 is a diagram illustrating still another internal standard solution measurement sequence in the electrolyte measurement unit of the automatic analysis device of the example.

FIG. 10 is a diagram illustrating an example of a measurement pattern in which the sequence of internal standard solution measurement A is used for analysis in the electrolyte measurement unit of the automatic analysis device of the example.

FIG. 11 is a diagram illustrating an example of a measurement pattern in which the sequence of internal standard solution measurement B is used for analysis in the electrolyte measurement unit of the automatic analysis device of the example.

FIG. 12 is a flowchart of selecting an operation plan in the automatic analysis device of the example.

FIG. 13 is a diagram illustrating an example of a setting screen for selecting the internal standard solution sequence in the automatic analysis device of the example.

FIG. 14 is a diagram illustrating another example of a setting screen for selecting the internal standard solution sequence in the automatic analysis device of the example.

DESCRIPTION OF EXAMPLES

Examples of an automatic analysis device and the automatic analysis device of the present invention and an automatic analysis method of a specimen will be described with reference to FIGS. 1 to 14.

First, the overall configuration of the automatic analysis device of the present example and the operation thereof will be described with reference to FIG. 1. FIG. 1 is a diagram schematically illustrating the overall configuration of the automatic analysis device of the present example.

An automatic analysis device 100 illustrated in FIG. 1 includes a transport unit 101, an analysis unit 111, and an operation unit 130.

The transport unit 101 is a unit for putting and collecting a specimen rack 104 on which one or more specimen containers containing biological specimens such as blood and urine to be analyzed are mounted into the automatic analysis device 100, and transporting the specimen rack 104 inside the automatic analysis device 100 to supply the specimen to the analysis unit 111.

The transport unit 101 includes a rack buffer 103, a rack supply tray 102, a rack storage tray 107, and a transport line 106.

In the transport unit 101, the specimen rack 104 installed in the rack supply tray 102 is transported to the rack buffer 103 by the transport line 106. There is a specimen presence or absence determination sensor (not illustrated) in the middle of the transport line 106, and the presence or absence of the specimen container on the specimen rack 104 is recognized. Here, if it is determined that a specimen container exists, the specimen barcode (not illustrated) attached to the specimen container is read by the specimen barcode reader (not illustrated) to recognize the identification information of the specimen. In the actual automatic analysis device 100, the patient is identified by this identification information.

The rack buffer 103 has a rotor structure that performs circular motion, and has slots that radially hold a plurality of specimen racks 104 on which a plurality of specimen containers are placed on the outer circumference on concentric circles. By rotating the slot with a motor, any specimen rack 104 is carried in and out of the analysis unit 111 of the request destination. Due to such a structure, it is not always necessary to process the specimen rack 104 placed first in order. In other words, if there is a high priority, the high priority specimen rack 104 can be processed first.

The transport line 106 is connected to a certain point on the radial circumference of the rack buffer 103, and the specimen rack 104 is carried in and out. Assuming that this one point is at a position of 0 degrees on the circumference, a specimen dispensation line 112 for drawing into the analysis unit 111, which will be described later, is connected at a position of 90 degrees on the circumference from the position where the transport line 106 is connected, and the specimen rack 104 is carried in and out.

The specimen rack 104 for which the analysis unit 111 completes the dispensing can wait for the output of the measurement result in the rack buffer 103 and perform processing such as automatic re-inspection as necessary. When the processing is completed, the specimen rack 104 is transported to the rack storage tray 107 via the transport line 106.

The analysis unit 111 is a unit that performs the measurement operation of the measurement item requested for the specimen and outputs the measurement result, and is connected to the transport unit 101.

The analysis unit 111 includes a reaction disk 115, a reagent disk 117, a specimen dispensation line 112, a reagent dispensation nozzle 116, a specimen dispensation nozzle 2, a colorimetric measurement unit 118, and an electrolyte measurement unit 114.

Reaction vessels (not illustrated) are arranged on the circumference of the reaction disk 115. The specimen dispensation line 112 into which the specimen rack 104 on which the specimen container is placed is carried is installed near the reaction disk 115.

The specimen dispensation nozzle 2 that can rotate and move up and down is installed between the reaction disk 115 and the specimen dispensation line 112. The specimen dispensation nozzle 2 moves while drawing an arc around the rotation axis, and the specimen is dispensed from the specimen rack 104 to the reaction vessel on the reaction disk 115 or a dilution tank 1 (see FIG. 2) in the electrolyte measurement unit 114.

The reagent disk 117 is a storage that can place a plurality of reagent bottles (not illustrated) in which the reagent is contained on the circumference. The reagent disk 117 is kept cold.

A reagent dispensation nozzle 116 that can rotate and move up and down is installed between the reaction disk 115 and the reagent disk 117. The reagent dispensation nozzle 116 moves while drawing an arc around the rotation axis, accesses the inside of the reagent disk 117 from the reagent dispensation nozzle suction port, and dispenses the reagent from the reagent bottle to the reaction vessel.

Further, a cleaning tank (not illustrated) is installed in the operating range of the reagent dispensation nozzle 116 and the specimen dispensation nozzle 2, respectively.

The electrolyte measurement unit 114 and the colorimetric measurement unit 118 are arranged around the reaction disk 115.

The electrolyte measurement unit 114 is an analysis unit that measures the electrolyte concentration in the specimen by using an ion selective electrode. The details will be described later with reference to FIG. 2.

The colorimetric measurement unit 118 is an analysis unit that analyzes the biochemical components in the specimen by measuring the absorbance of the reaction solution produced by mixing and reacting in the reaction vessel on the reaction disk 115, and the analysis items having a different measuring principle from that of the electrolyte measurement unit 114. The colorimetric measurement unit 118 includes a light source, a spectrophotometer, and the like.

The operation unit 130 is a portion that plays the role of controlling the information about the entire automatic analysis device 100 and includes a display unit 131, an input unit 132, a recording unit 133, and an overall control unit 134. The operation unit 130 is connected to the analysis unit 111 and the transport unit 101 by a wired or wireless network line.

The display unit 131 is a portion on which various screens such as an operation screen for ordering measurement items to be measured for a specimen to be measured, a screen for observing the measurement result, and the like are displayed, and is composed of a liquid crystal display and the like. The display unit 131 does not need to be composed of a liquid crystal display and may be composed of a printer or the like instead of the liquid crystal display, and can be composed of a display and a printer or the like or further can be composed of a touch panel type display that also serves as the input unit 132, which will be described later.

The input unit 132 is a portion that inputs various parameters and settings, measurement results, measurement request information, analysis start and stop instructions, and the like based on the operation screen displayed on the display unit 131, and is composed of a keyboard, a mouse, and the like.

The recording unit 133 is a portion that stores time charts and operation parameters necessary for the operation of each device configuring the automatic analysis device 100, various information for identifying a biological specimen, measurement results, and the like, and is composed of a storage medium such as a semiconductor memory composed of a flash memory and the like, and a magnetic disk composed of an HDD and the like.

The overall control unit 134 is a portion that controls the operation of the entire automatic analysis device 100, and includes a control unit for transport unit 134a, a control unit for analysis unit 134b, and a computation recording unit 134c.

The control unit for transport unit 134a controls the operation of transporting an appropriate specimen rack 104 from the rack buffer 103 to the specimen dispensation line 112 and the transport operation of returning the specimen rack 104 from the specimen dispensation line 112 to the rack buffer 103.

The control unit for analysis unit 134b is connected to each device in the analysis unit 111 described above and controls the analysis operation by each component device of the electrolyte measurement unit 114 and the colorimetric measurement unit 118.

The computation recording unit 134c calculates the concentration of the specific component in the measurement target from the absorbance or the like measured by the colorimetric measurement unit 118, and calculates the ion concentration of the measurement target from the potential measured by the electrolyte measurement unit 114.

The control unit for transport unit 134a, the control unit for analysis unit 134b, and the computation recording unit 134c in the overall control unit 134 may be implemented by using a general-purpose computer, and may be implemented as a function of a program executed on the computer.

That is, the processes of the control unit for transport unit 134a, the control unit for analysis unit 134b, and the computation recording unit 134c may be stored as program codes in a recording unit such as a memory, and may be implemented by a processor such as a central processing unit (CPU) executing each program code.

The control unit for transport unit 134a, the control unit for analysis unit 134b, and the computation recording unit 134c may be configured by hardware such as a dedicated circuit board.

In the present example, the case where the analysis unit provided at the same time as the electrolyte measurement unit 114 is the colorimetric measurement unit 118 is described, but the analysis unit is not limited to the colorimetric measurement unit that measures biochemical items.

For example, a measurement unit for measuring immune items and the electrolyte measurement unit 114 can be disposed in the same analysis unit. Further, the analysis unit may be composed of the electrolyte measurement unit 114 alone.

Further, although the case where the automatic analysis device 100 includes one analysis unit 111 is described, two or more analysis units can be provided. In this case, the type of the analysis unit is not particularly limited, and various analysis units such as a biochemical analysis unit, an immunoanalysis unit, and a blood coagulation analysis unit can be provided one or more, respectively.

Further, although the case where the automatic analysis device 100 includes the transport unit 101 is described, the transport unit is not essential, and the automatic analysis device can be configured by the analysis unit and the operation unit.

Next, the outline of the mechanical operation of the automatic analysis device 100 illustrated in FIG. 1 will be described.

The transport unit 101 sends out the specimen racks 104 installed in the rack supply tray 102 of the automatic analysis device 100 one by one onto the transport line 106 and carries the specimen racks 104 into the rack buffer 103. The specimen rack 104 transported to the rack buffer 103 is transported to the specimen dispensation line 112 of the analysis unit 111.

When the specimen rack 104 arrives at the specimen dispensation line 112, the specimen dispensation nozzle 2 executes the dispensing operation for each specimen placed on the specimen rack 104 according to the measurement items requested by the operation unit 130.

If the measurement item is a biochemical item, the specimen dispensation nozzle 2 discharges the sucked specimen into the reaction vessel on the reaction disk 115, and the reagent sucked from the reagent disk 117 is further added to the reaction vessel by the reagent dispensation nozzle 116 and stirred. After that, the absorbance is measured by the colorimetric measurement unit 118, and the measurement result is transmitted to the computation recording unit 134c of the operation unit 130.

If the requested measurement item is an electrolyte item, the specimen dispensation nozzle 2 discharges the sucked specimen into the dilution tank 1 of the electrolyte measurement unit 114, the electromotive force is measured by the ion selective electrodes 7, 8, and 9, and the measurement result is transmitted to the computation recording unit 134c of the operation unit 130. However, in the case of electrolyte item measurement, as described above, a pre-measurement operation of measuring the electromotive force of the internal standard solution having a known concentration is required before dispensing the specimen.

The computation recording unit 134c of the operation unit 130 obtains the concentration of a specific component in the specimen by the calculation processing from the transmitted measurement result. The analysis result is notified to the user via the display unit 131 and recorded in the recording unit 133.

Next, the outline of the electrolyte measurement unit using the ion selective electrode will be described with reference to FIG. 2. FIG. 2 is a schematic diagram illustrating an example of the electrolyte measurement unit using the ion selective electrode.

The electrolyte measurement unit 114 is disposed in the analysis unit 111 that automatically analyzes the specimen.

The electrolyte measurement unit 114 includes the dilution tank 1, a diluent dispensation nozzle 3, an internal standard solution dispensation nozzle 4, a specimen liquid suction nozzle 5, a pipe 6, a sodium ion selective electrode 7, a potassium ion selective electrode 8, and a chlorine ion selective electrode 9, a reference electrode 10, a pipe 11, a sipper pump 12, a potential measurement unit 13, a temperature control unit 16, and the like.

The specimen dispensation nozzle 2 dispenses and discharges a specimen such as blood or urine into the dilution tank 1, and the diluent dispensation nozzle 3 dispenses and discharges the diluent into the dilution tank 1. The internal standard solution dispensation nozzle 4 dispenses and discharges the internal standard solution into the dilution tank 1.

The diluent is sent from a diluent container 14 to the diluent dispensation nozzle 3 by using a diluent pump (DIL pump) 18. The internal standard solution is sent from an internal standard solution container 15 to the internal standard solution dispensation nozzle 4 by using an internal standard solution pump (IS pump) 19.

The temperature control unit 16 is disposed in the flow paths of the diluent and the internal standard solution and controls the temperature to a constant temperature (for example, 37° C.) while sending each solution. The temperature control efficiency can be improved by making the volume of the flow path near the temperature control unit 16 larger than that of other parts.

The specimen liquid suction nozzle 5 is configured to be movable up and down and sucks the solution in the dilution tank 1 by the driving force of the sipper pump 12. The sucked solution is introduced into the flow paths of the ion selective electrodes 7, 8, and 9 through the pipe 6, and is further drained through the pipe 11.

In the electrolyte measurement unit 114, the specimen liquid suction nozzle 5, the pipe 6, the pipe 11, and the sipper pump 12 are used as a specimen introduction unit for introducing a specimen liquid containing an electrolyte. By using the specimen introduction unit, the specimen liquid is introduced into the flow paths of the ion selective electrodes 7, 8, and 9.

Further, a comparative electrode solution is introduced into the reference electrode 10 from a comparative electrode solution container 17 by the pipe 11 and the sipper pump 12. The comparative electrode solution is switched to a different flow path from that of the internal standard solution in the ion selective electrodes 7, 8, and 9, and the like by using a valve or the like so that there is no contamination with the internal standard solution.

The terminals of the ion selective electrodes 7, 8, and 9 and the reference electrode 10 are connected to the potential measurement unit 13, and the potential difference between the electrodes is measured in a state of the specimen liquid being introduced.

As described above, in order to measure the potential of the specimen in the electrolyte measurement unit 114, it is necessary to measure the internal standard solution. In the present example, however, when the potential of the specimen is continuously measured by the electrolyte measurement unit 114, the measurement operation of the internal standard solution before the potential measurement is changed depending on whether or not there is a possibility that the specimen measured immediately before is a high concentration specimen.

In particular, in the present example, there are provided with a first time chart, which is a time chart for the case where there is no possibility that the immediately preceding measurement is for a high concentration specimen and in which an idle time when the electrolyte measurement unit 114 does not operate is provided at the beginning of the time chart, and a second time chart, which is a time chart for the case where there is a possibility that the immediately preceding measurement is for a high concentration specimen and in which an idle time when the electrolyte measurement unit 114 does not operate is not provided at the beginning and the operations of discharging and sucking at least one of the internal standard solution and the diluent that dilutes the specimen is performed.

In other words, in the measurement operation of the internal standard solution when the specimen is measured by the electrolyte measurement unit 114 of the present example, in the first time chart for the case where there is no possibility that the immediately preceding measurement is for a high concentration specimen, without performing the operations of discharging and sucking at least one of the internal standard solution and the diluent that dilutes the specimen, which are performed when there is a possibility that the immediately preceding measurement is for a high concentration specimen, the measurement of the internal standard solution is started after the time required for the operations elapses.

On the other hand, in the second time chart for the case where there is a possibility that the immediately preceding measurement is for a high concentration specimen, the operations of discharging and sucking at least one of the internal standard solution and the diluent that dilutes the specimen are performed at a timing before the measurement operation of the internal standard solution, corresponding to the idle time of the first time chart.

The time chart for controlling the operations is stored in the recording unit 133 and is executed by the control unit for analysis unit 134b of the overall control unit 134.

FIG. 3 is an example of a flowchart for measuring the electrolyte concentration using the electrolyte concentration measuring device of FIG. 2.

As illustrated in FIG. 3, first, the internal standard solution is discharged to the dilution tank 1 by using the internal standard solution dispensation nozzle 4 (step S101).

Next, the internal standard solution in the dilution tank 1 is sucked by using the specimen liquid suction nozzle 5 and the sipper pump 12 (step S102). As a result, the flow paths of the ion selective electrodes 7, 8, and 9 are filled with the internal standard solution.

Next, the potential measurement unit 13 is used to measure the potentials of the ion selective electrodes 7, 8, and 9 with the reference electrode 10 as a reference (step S103). Here, the potentials of the ion selective electrodes 7, 8, and 9 are assumed to be E1.

Next, the specimen is discharged into the dilution tank 1 by using the specimen dispensation nozzle 2 (step S104).

Next, the diluent is discharged into the dilution tank 1 by using the diluent dispensation nozzle 3 (step S105). As a result, the specimen is diluted so that the amount of the specimen and the amount of the diluent become the set ratio.

Next, the diluted specimen in the dilution tank 1 is sucked by using the specimen liquid suction nozzle 5 and the sipper pump 12 (step S106). As a result, the flow paths of the ion selective electrodes 7, 8, and 9 are filled with the specimen liquid.

Next, the potential of the ion selective electrodes 7, 8, and 9 with the reference electrode as a reference is measured by using the potential measurement unit (step S107). Here, the potentials of the ion selective electrodes 7, 8, and 9 are assumed to be E2.

Next, the computation recording unit 134c calculates the concentration of the ion to be measured in the specimen from the potentials E1 and E2 previously actually measured (step S108) and outputs the concentration to the recording unit 133, the display unit 131, and the like (step S109).

After that, the internal standard solution is discharged to the dilution tank 1 (step S101) and the internal standard solution is sucked into the dilution tank 1 again (step S102) to complete the measurement.

In the case of the first time chart in which the electrolyte measurement is continuous, steps S101 to S109 are repeated.

FIG. 4 is an outline of the operation time charts of the internal standard solution measurement and the specimen measurement at the time of the continuous measurement.

As illustrated in FIG. 4, first, in the measurement of the internal standard solution, the internal standard solution pump 19 performs a suction operation to prepare for discharging the internal standard solution to the dilution tank 1 (step S201). At this time, the suction amount is the setting of the automatic analysis device 100, and for example, 355 [μL] is sucked.

Next, the diluent pump 18 performs a suction operation to prepare for the discharge to the dilution tank 1 (step S202). At this time, the suction amount is also the setting of the automatic analysis device 100, and for example, 330 [μL] is sucked.

After that, predetermined amounts of the internal standard solution and the diluent are discharged (step S203 and step S204). At this time, the discharge amount is also the setting of the automatic analysis device 100. For example, the internal standard solution is discharged at 220 [μL] and the diluent is discharged at 330 [μL].

After that, in order to prevent dripping from the tip of the nozzle, the air is sucked into both the diluent dispensation nozzle 3 and the internal standard solution dispensation nozzle 4 (step S205 and step S206). Up to this point, the dilution tank cleaning operation before measuring the internal standard solution is performed.

Next, the internal standard solution is sucked by the internal standard solution pump 19 (step S207). At this time, the suction amount is also the setting of the automatic analysis device 100, and is, for example, 365 [μL]. After that, the internal standard solution is discharged to the dilution tank 1 by the internal standard solution pump 19 (step S208). At this time, the suction amount is also the setting of the automatic analysis device 100, and is, for example, 500 [μL]. After discharging the internal standard solution, the air is sucked from the internal standard solution dispensation nozzle 4 by the internal standard solution pump 19 in order to prevent dripping from the nozzle (step S209).

Next, the internal standard solution discharged to the dilution tank 1 is drawn into the flow paths of the ion selective electrodes 7, 8, and 9 by using the sipper pump 12 (step S210). After that, the air is sucked from the specimen liquid suction nozzle 5 by using the sipper pump 12 to prevent dripping (step S211).

After that, in order to measure the potential of the comparative electrode solution, the comparative electrode solution is sucked by the sipper pump 12 (step S212). Here, the comparative electrode solution is switched to a different flow path from that of the internal standard solution by using a valve or the like so that there is no contamination with the internal standard solution. As a result, the reference electrode 10 is filled with the comparative electrode solution.

After a series of operations is completed, the sipper pump 12 is returned to the home position and the liquid in the flow path is drained (step S213). Finally, the potentials of the ion selective electrodes 7, 8, and and the reference electrode 10 are acquired (step S214).

Next, the time chart at the time of specimen measurement will be described with reference to FIG. 4.

In the specimen measurement, first, a suction operation for discharging the diluent is performed by the diluent pump 18 (step S215).

Next, the diluent and the specimen are discharged into the dilution tank 1. The diluent is discharged in two portions. After the first portion of the diluent is discharged (step S216), the specimen is discharged, and the second portion of the diluent is discharged (step S217). The specimen is discharged using the specimen dispensation nozzle 2. Here, the ratio of the specimen to the diluent is set by the device. Then, in order to prevent dripping, the air is sucked from the diluent dispensation nozzle 3 (step S218).

Next, the diluted specimen liquid in the dilution tank 1 is sucked by the sipper pump 12 (step S219). After that, the air is sucked from the specimen liquid suction nozzle 5 to prevent dripping (step S220).

After that, in order to measure the potential of the comparative electrode solution, a suction operation of the comparative electrode solution is performed by the sipper pump 12 (step S221). After the series of operations is completed, and the sipper pump 12 is returned to the home position and the liquid in the flow path in each electrode is drained (step S222).

Finally, the potential of each electrode is acquired (step S223).

Here, as illustrated in FIGS. 4 and 5, a series of operation sequences of the internal standard solution measurement and the specimen measurement described above can be overlapped by adjusting the operation timing of each mechanism.

For example, as illustrated in FIG. 5, in the cycle time T101 of the internal standard solution measurement and the specimen measurement for measuring a certain specimen, the processing is performed by overlapping the latter half part ½ of the internal standard solution measurement and the first half part ½ of the specimen measurement. As a result, the specimen measurement can proceed in the cycle of T101 instead of T101×2 in total.

If the electrolyte processing capacity of this device can process 150 specimens per hour, the operation cycle of T101 is to be 24 seconds. That is, the time required for the specimen measurement is also 24 seconds. Similarly, it takes 24 seconds to measure the potential of the internal standard solution.

Here, in the present example, when the electrolyte concentration is continuously measured by the electrolyte measurement unit 114, the operation sequence is used properly depending on whether or not there is a possibility that the immediately preceding measurement is for a high concentration specimen. The details will be described with reference to FIG. 6 and later. FIG. 6 illustrates an internal standard solution measurement sequence with a cleaning effect and a normal internal standard solution measurement sequence, which are executed for measuring the internal standard solution after measuring the potential of a high concentration specimen.

The measurement sequence of the internal standard solution measurement A illustrated in the upper part of FIG. 6 is an operation sequence in the same order as the internal standard solution measurement illustrated in FIG. 4, and is a measurement sequence (first time chart) in the case of measuring the potential of a specimen in a normal concentration range where there is no possibility that the immediately preceding measurement is for a high concentration specimen.

On the other hand, the measurement sequence of the internal standard solution measurement B illustrated in the lower part of FIG. 6 is a measurement sequence (second time chart) when there is a possibility that the immediately preceding measurement is for a high concentration specimen, and adds the suction and discharge operations of the diluent to the first part of the operation of one cycle. The details of this operation will be described later.

By preparing a sequence that incorporates the operation with such a cleaning effect into the sequence of internal standard solution measurement and using the sequence properly with the normal sequence, it is possible to obtain a cleaning effect without consuming a cycle for cleaning at the required timing while executing the continuous measurement.

As illustrated in FIG. 6, the internal standard solution measurement A has an idle time as illustrated in the section IS-1 before actually starting the process of the internal standard solution measurement. For example, a time of 5 to 20% of a cycle of 24 seconds for the internal standard solution operation, for example, 4.4 seconds (about 18.3%) is secured as the section IS-1. It is desirable that the time of this section IS-1 is a time that allows the process of the cleaning operation described later.

On the other hand, the internal standard solution measurement B uses the above-mentioned section IS-1 to suck and discharge only the diluent as the cleaning solution, and to draw the diluent into the electrode flow path. That is, the section IS-1 is used to execute the diluent suction operation (step S401) for discharging the diluent to the dilution tank 1, the diluent discharge operation (step S402) for discharging the diluent to the dilution tank 1, and the air suction operation (step S403) for preventing dripping from the diluent dispensation nozzle 3. These operations correspond to conditioning operations, and the same effect can be obtained on the analysis performance.

Here, it is desirable that the discharge amount of the diluent is larger than that of any of the operations of step S203, step S204, and step S208. Here, for example, 600 [μL] is discharged.

Further, the time chart to which the cleaning effect is imparted is not limited to the internal standard solution measurement B as illustrated in FIG. 6, and it is also possible to prepare an internal standard solution measurement C (second time chart) for discharging and sucking the internal standard solution in addition to the diluent at the time of the section IS-1 as illustrated in the lower part of FIG. 7. FIG. 7 is a diagram illustrating another example of the internal standard solution measurement sequence.

In the internal standard solution measurement C, in parallel with the above steps S401, S402, and S403, the section IS-1 is used to execute the internal standard solution suction operation (step S501) for discharging the internal standard solution to the dilution tank 1, the internal standard solution discharge operation (step S502) for discharging the internal standard solution to the dilution tank 1, and the air suction operation (step S503) for preventing dripping from the internal standard solution dispensation nozzle 4.

Regarding the discharge amounts of the diluent and the internal standard solution in the section IS-1 of the internal standard solution measurement C, it is desirable that the total of the discharge amounts of the two liquids is larger than that of any of the operations of step S203, step S204, and step S208. For example, by setting the discharge amount of the diluent to 300 [μL] and the discharge amount of the internal standard solution to 300 [μL], the consumption amounts of the diluent and the internal standard solution can be matched.

As a result, it is possible to control the temperature of the internal standard solution flow path and the nozzle and improve the stability when discharging the internal standard solution in steps S203 and S208.

The discharge ratio of the diluent and the internal standard solution can be changed according to the volume of each reagent container. For example, in a sequence in which the cleaning operation is performed with a mixed solution of both the internal standard solution and the diluent, as in the internal standard solution measurement C, a setting screen 601 as illustrated in FIG. 8 is displayed on the display unit 131 to make it possible for the user to freely set the set discharge amount of the diluent in a diluent discharge amount selection area 602 and the setting and output of the internal standard solution in an internal standard solution discharge amount selection area 603.

Generally, for cleaning, it is sufficient that the specimen component can be discharged from the electrode flow path, and thus, the mixing ratio of the internal standard solution and the diluent does not affect the cleaning performance. Moreover, since both the diluent and the internal standard solution are reagents used for actual specimen measurement, even if the mixing ratio of each reagent at the time of cleaning changes, it does not largely affect the potential measurement of the specimen.

By making it possible to set the amount of the internal standard solution and the amount of the diluent used during the cleaning operation in this way, it becomes possible to balance the consumption amount and obtain the advantage that the replacement timing of the reagent container can be set to the same cycle.

Further, it is possible to prepare a time chart for drawing the diluent or the internal standard solution discharged into the dilution tank 1 in the above-mentioned steps S402 and S502 into the electrode flow path. A diagram of the measurement sequence of the internal standard solution measurement in this case is illustrated in FIG. 9.

As illustrated in FIG. 9, in the measurement sequence of the internal standard solution measurement D drawn into the electrode flow path side, since it is necessary to complete the suction to the electrode flow path side and the drain of the liquid by using the section IS-1, the diluent suction operation (step S404) for discharging the diluent to the dilution tank 1, the diluent discharge operation (step S405) for discharging the diluent to the dilution tank 1, and the air suction operation (step S406) for preventing dripping from the diluent dispensation nozzle 3 are performed, but these operation times are shorter than those of steps S401, S402, and S403 illustrated in FIG. 6, respectively.

After that, the suction operation of the diluent discharged to the dilution tank 1 is performed by the sipper pump 12 (step S601). Then, after that, the air is sucked from the specimen liquid suction nozzle 5 by using the sipper pump 12 to prevent dripping (step S602). After the series of operations is completed, the sipper pump 12 is returned to the home position and the liquid in the flow path is drained (step S603).

The suction to the electrode flow path side and liquid drain operation can be performed in the above-mentioned internal standard solution measurement C, the internal standard solution measurement E which will be described later, and the like.

Further, although not illustrated, a time chart for discharging and sucking only the internal standard solution in the time of the section IS-1 can be prepared, and in this case as well, the internal standard solution can be drawn into the electrode flow path side.

FIG. 10 illustrates an example of a measurement pattern in which only the normal concentration range specimen is measured in the ISE measurement, and FIG. 11 illustrates an example of the measurement pattern in which the high concentration range specimen is measured between the measurements of the normal concentration range specimens.

When measuring only the normal concentration range specimen, as illustrated in FIG. 10, only the internal standard solution measurement A is executed between the specimen measurements. On the other hand, when the measurement of the high concentration range specimen is included, as illustrated in FIG. 11, the internal standard solution measurement B is selected for the internal standard solution measurement after the potential measurement of the high concentration range specimen.

Here, the determination of whether or not there is a possibility that the specimen to be measured is a high concentration range specimen is made by the setting on the device.

For example, the setting for determination uses the information set for each specimen type.

Generally, when the device receives a measurement request from the host communication device or the user's manual input, the specimen type setting is included. The specimen type here indicates the type of measurement specimen depending on the collection site in the specimen collected for in vitro diagnosis. Examples of the specimen type include serum, plasma, urine, cerebrospinal fluid, and the like.

The control unit for analysis unit 134*b* of the overall control unit 134 determines whether or not the specimen corresponds to a high concentration range specimen based on the specimen type information. For example, since the high concentration range in the measurement range of the potassium ion concentration of the urine specimen is 10 times or more than the measurement range of the general serum specimen, the urine specimen type is determined as a high concentration region specimen. FIG. 12 illustrates a selection flow of the internal standard solution measurement according to the specimen type.

As illustrated in FIGS. 10 and 11, the scheduling of the internal standard solution measurement is executed, for example, at the timing of starting the specimen measurement before the start of the internal standard solution measurement sequence, or at a time corresponding to the start timing in the case of the empty cycle without specimen measurement before the start of the specimen measurement, by the control unit for analysis unit 134*b* of the overall control unit 134.

As illustrated in FIG. 12, first, after starting the internal standard solution measurement scheduling (F101), the control unit for analysis unit 134*b* determines whether or not the specimen potential measurement is performed before the planned internal standard solution measurement (F102). At this time, if the specimen potential measurement is not performed, the internal standard solution measurement A is planned (F103).

However, there is no problem in using the internal standard solution measurement B for the internal standard solution measurement with the F103. In this case, it is possible to obtain a conditioning effect for reducing the temperature effect at the time of ISE measurement due to the empty interval between measurements due to the cleaning operation of the internal standard solution measurement B.

Therefore, when the setting gives priority to the stabilization of the internal standard solution potential, the internal standard solution measurement B can be set to be selected.

If the specimen potential is measured before the internal standard solution measurement, then it is determined whether or not there is a possibility that the specimen measurement is for a high concentration range specimen (F104). If there is no possibility that the specimen measurement is for a high concentration range specimen, for example, if it is determined to be a specimen other than a urine specimen, the internal standard solution measurement A is planned (F105).

On the other hand, if there is a possibility that the specimen measurement is for a high concentration range specimen, the internal standard solution measurement B is planned (F106). In this case, instead of the internal standard solution measurement B, any of the internal standard solution measurement C, the internal standard solution measurement D, and the internal standard solution measurement E described later can be planned.

The determination as to whether or not there is a possibility that the specimen to be measured is a high concentration range specimen is assumed to be made according to the setting input by the user.

For example, as illustrated in FIG. 13, on a setting screen 701 displayed on the display unit 131, the type of the target specimen is input in a specimen type selection area 711 used for the ISE measurement, and the user operates the input unit 132 in the concentration selection area 712 to set whether the concentration of the target specimen is standard or there is a possibility that the target specimen is a high concentration range specimen.

When the concentration range is selected for each specimen type by the user, the type of measurement sequence used is displayed in the measurement sequence display area 713.

FIG. 13 illustrates the case where the urine specimen is used as a high concentration range specimen and the internal standard solution measurement B is used for the internal standard solution potential measurement after the specimen measurement.

Further, on the setting screen 701, the type of the electrolyte to be analyzed can be selected in an evaluation target electrolyte type selection area 702.

Regarding the above-mentioned setting of the high concentration range specimen and the setting of the internal standard solution for that, each option is not limited to one option of the high concentration range specimen and the internal standard solution measurement B, but there may be a plurality of options.

For example, as the internal standard solution measurement E (second time chart), an operation in which the amount of the reagent used for the cleaning operation is reduced can be prepared, and as the setting of the corresponding specimen, a medium concentration range specimen can be set.

The risk of carry-over is lower in the medium concentration range specimen than in the high concentration range. Therefore, as illustrated in FIG. 14, when it is selected to have a possibility of an injection concentration range specimen in the concentration selection area 732 of the setting screen 721, the internal standard solution measurement E that is set with the total amount of the diluent and internal standard solution which are used for cleaning reduced is selected, and "internal standard solution measurement E" is displayed as the type of measurement sequence used in the measurement sequence display area 733.

The criteria for determining the possibility of a high concentration specimen are not limited to the information set for each specimen type as described above. For example, in the case of re-inspection of a specimen, the result of the previous inspection can be used.

More specifically, for example, even if the information set based on the specimen type is set to have a possibility of a high concentration specimen, if the previous inspection shows that the concentration of the target specimen is not high concentration, the measurement sequence of the internal standard solution measurement A can be used in the re-inspection of the specimen. Similarly, even if the information set based on the specimen type is set to have no possibility of a high concentration specimen, if the previous inspection shows that the concentration of the target specimen is high concentration, the measurement sequences of the internal standard solution measurements B, C, D, and E can be used in the re-inspection of the specimen.

Further, the operation of drawing reagent into the electrode flow path during the section IS-1 cleaning operation does not necessarily have to be the same as that at the time of potential measurement of the internal standard solution.

Generally, for cleaning, the faster the speed of the fluid flowing in the flow path, the better the cleaning effect. Therefore, during the cleaning operation corresponding to the idle time of the internal standard solution measurement A in the internal standard solution measurements B, C, D, and E, it is desirable that the syringe suction operation of the internal standard solution and the diluent into the electrode flow path at the time of potential measurement of the internal standard solution is performed faster than any operation performed at the time of potential measurement of the internal standard solution.

Further, the reagent discharged into the dilution tank 1 in the internal standard solution measurement D may be sucked in two times.

Next, the effect of the present example will be described.

The automatic analysis device 100 of the present example described above includes the electrolyte measurement unit 114 that measures the internal standard solution once or more at least before the potential measurement of the specimen, and when the potential measurement of the specimen is continuously executed by the electrolyte measurement unit 114, a measurement operation of the internal standard solution before the potential measurement is changed depending on whether or not there is a possibility that the specimen measured immediately before is a high concentration specimen.

In this way, a sequence necessary for stabilizing the analysis performance is prepared in which an operation that has the same effect as the cleaning process, in which an idle time is to be created in the internal standard solution measurement that is essential for electrolyte measurement and a separate operation sequence is to be prepared, is added, and the sequence is executed when there is a possibility that the immediately preceding specimen is a high concentration specimen, it is possible to reduce the occurrence of carry-over in the electrolyte measurement unit 114 starting from the dilution tank, as compared with the conventional technology.

In particular, the actual electrode flow path of the electrolyte measurement unit has a structure in which joints are present between electrodes, an ion selection membrane is installed, there are more irregularities than the normal flow path, and stains are likely to remain. Therefore, there is a concern that carry-over may actually occur due to the specimen solution left behind not only in the dilution tank but also in the electrode flow path.

However, due to the control operation as in the present invention, even if there are irregularities in the dilution tank 1 and the electrode flow path where stains easily accumulate, or even if the nozzles are slightly misaligned, the carry-over rate can be expected to be significantly reduced, and the device can thus be made more robust than the conventional technology with respect to the carry-over performance in the long-term device operation.

In addition, the potential measurement of the internal standard solution including cleaning can be executed in the same cycle as the continuous measurement, and the cycle occupied by cleaning is eliminated, so that the risk of a decrease in processing capacity in electrolyte measurement can be reduced.

Furthermore, since the operation of the internal standard solution measurement A is changed only in the section IS-1, it is not necessary to prepare a complicated sequence in terms of software configuration, and it can be expected that the design and processing in system management will be simplified.

As described above, it is possible to provide an automatic analysis device that can contribute to the stability of electrolyte data, the speed of inspection, and the data stability.

Originally, since the specimen concentration before the measurement is unknown, it is impossible to determine whether to avoid carry-over for the electrode flow path until measuring the internal standard solution after measuring the specimen potential. On the other hand, as a criterion for determining the possibility of a high concentration specimen, the information set for each specimen type is used, and the general concentration range information of ISE known for each specimen type is taken into consideration so as to make it possible to set an appropriate internal standard solution measurement operation for each specimen type, and it thus becomes possible to automatically perform the internal standard solution measurement including a cleaning operation when there is a high possibility of a high concentration range. As a result, the risk of carry-over can be greatly reduced.

Furthermore, in the case of specimen re-inspection, the risk that carry-over actually occurs can be reliably reduced by using the result of the previous inspection as a criterion for determining the possibility of a high concentration specimen.

If there is a possibility that the specimen measured immediately before is a high concentration specimen, the insides of the ion selective electrodes 7, 8, and 9 and the reference electrode 10 can also be cleaned by sucking at least one of the internal standard solution and the diluent that dilutes the specimen to the electrode of the electrolyte measurement unit, and the carry-over can be reduced more effectively.

Further, by dividing the operation of sucking at least one of the internal standard solution and the diluent to the electrode two times, it is possible to surely reduce the carry-over.

In addition, there are provided with the internal standard solution measurement A, which defines the operation of the electrolyte measurement unit 114 when there is no possibility that the immediately preceding measurement is for a high concentration specimen, and the internal standard solution measurements B, C, D, and E for the operation of the electrolyte measurement unit 114 when there is a possibility that the immediately preceding measurement is for a high concentration specimen. In particular, the internal standard solution measurement A has an idle time when the electrolyte measurement unit 114 does not operate, at the beginning of the time chart, and the internal standard solution measurements B, C, D, and E are defined to perform the operations of discharging and sucking at least one of the internal standard solution and the diluent that dilutes the specimen at a timing corresponding to the idle time of the internal standard solution measurement A, and thus it is possible to quickly switch the operation of the electrolyte measurement between the case of being continuous and the case of being discontinuous, and the device can be operated stably.

Further, since the internal standard solution measurement B is defined to perform the operations of discharging and sucking only the diluent, the accuracy of the electrolyte measurement can be surely improved while suppressing the consumption of the reagent from increasing more than necessary.

Furthermore, the internal standard solution measurement C is defined to perform the operations of discharging and sucking both the internal standard solution and the diluent, and the situation where only one of the reagents is used extremely can be avoided even if the internal standard solution measurement C is selected irregularly. Therefore, it is possible to reduce the bias in the consumption of the internal standard solution and the diluent, and it is possible to reduce the bias in the frequency of replacement of the reagent container.

Further, among the internal standard solution measurements B, C, D, and E, the suction operation of the internal standard solution and the diluent that is sucked at the timing corresponding to the idle time of the internal standard solution measurement A is performed faster than any operation time executed at the time of potential measurement of the internal standard solution, the cleaning effect can be enhanced and the probability of occurrence of carry-over can be further reduced.

Furthermore, by setting the criteria for whether or not there is a possibility that the specimen is a high concentration specimen in multiple stages, it is possible to suppress excessive cleaning or to execute an operation with a higher cleaning effect, which makes it possible to further reduce the risk of carry-over.

In addition, since the discharge amounts of the internal standard solution and the diluent in the internal standard solution measurements B, C, D, and E can be set by the user, it is possible to adjust the balance between the cleaning process and the consumption of each reagent according to the fluctuation of the measurement situation such as the measurement environment and the measurement interval, and the device installation environment.

Others

The present invention is not limited to the above example, and various modifications and applications are possible. The above-described examples have been described in detail in order to explain the present invention in an easy-to-understand manner and are not necessarily limited to those having all the described configurations.

REFERENCE SIGNS LIST

1: Dilution tank
2: Specimen dispensation nozzle
3: Diluent dispensation nozzle
4: Internal standard solution dispensation nozzle 5: Specimen liquid suction nozzle
6: Pipe
7: Sodium ion selective electrode
8: Potassium ion selective electrode
9: Chlorine ion selective electrode
10: Reference electrode
11: Pipe
12: Sipper pump
13: Potential measurement unit
14: Diluent container
15: Internal standard solution container
16: Temperature control unit
17: Comparative electrode solution container
18: Diluent pump (DIL pump)
19: Internal standard solution pump (IS pump)
100: Automatic analysis device
101: Transport unit
102: Rack supply tray
103: Rack buffer
104: Specimen rack
106: Transport line
107: Rack accommodation tray
111: Analysis unit
112: Specimen dispensation line
114: Electrolyte measurement unit
115: Reaction disk
116: Reagent dispensation nozzle
117: Reagent disk
118: Colorimetric measurement unit
130: Operation unit
131: Display unit
132: Input unit
133: Recording unit
134: Overall control unit
134a: Control unit for transport unit
134b: Control unit for analysis unit
134c: Computation recording unit
601: Setting screen
602: Discharge amount selection area
603: Discharge amount selection area
701: Setting screen
702: Electrolyte type selection area
711: Specimen type selection area
712: Density selection area
713: Measurement sequence display area
721: Setting screen
732: Concentration selection area
733: Measurement sequence display area

The invention claimed is:

1. An automatic analysis device that automatically analyzes a specimen, the device comprising:
an electrolyte measurement unit configured to execute a measurement operation, in a predetermined cycle, of measuring an internal standard solution once or more at least before a potential measurement of a second specimen,
wherein the potential measurement of the second specimen is continuously executed by the electrolyte measurement unit, and upon determining there is a possibility that a first specimen measured immediately before the second specimen is a high concentration specimen based on a comparison of a first ion concentration measurement range of the first specimen and a second ion concentration measurement range of the second specimen, the measurement operation of the internal standard solution before the potential measurement of the second specimen is changed without changing a duration of the predetermined cycle.

2. The automatic analysis device according to claim 1, further comprising:
a controller coupled to the electrolyte measurement unit, the controller being configured to store information for each of a plurality of specimen types, the first specimen and the second specimen being different specimen types,
wherein the information includes the first ion concentration measurement range and the second ion measurement range.

3. The automatic analysis device according to claim 1, further comprising:
a controller coupled to the electrolyte measurement unit, the controller being configured to, upon determining there is the possibility that the first specimen is the high concentration specimen, control the electrolyte measurement unit to suck at least one of the internal standard solution and a diluent for diluting the second specimen to an electrode of the electrolyte measurement unit.

4. The automatic analysis device according to claim 1, further comprising:
a storage medium, the storage medium storing a first time chart defining a timing of the operation of the electrolyte measurement unit that is used upon determining there is no possibility that the first specimen is a high concentration specimen, and a second time chart defining the operation of the electrolyte measurement unit that is used upon determining there is a possibility that the second specimen is a high concentration specimen.

5. The automatic analysis device according to claim 4, wherein the first time chart includes an idle time at which the electrolyte measurement unit does not operate at the beginning of the time chart, and
wherein the second time chart is defined such that during a time corresponding to the idle time of the first time chart, an operation of discharging and sucking at least one of the internal standard solution and a diluent for diluting the specimen is performed.

6. The automatic analysis device according to claim 5, wherein the second time chart is defined such that, among the operation of discharging and sucking at least one of the internal standard solution and the diluent for diluting the specimen, discharging and sucking only the diluent is performed.

7. The automatic analysis device according to claim 5, wherein the second time chart is defined such that, among the operation of discharging and sucking at least one of the internal standard solution and the diluent for diluting the specimen, discharging and sucking both the internal standard solution and the diluent is performed.

8. The automatic analysis device according to claim 7, wherein a user sets discharge amounts of the internal standard solution and the diluent in the second time chart.

9. A method of automatic analysis of a specimen using an automatic analysis device that includes an electrolyte measurement unit, the method comprising:
executing, by the electrolyte measurement unit, a measurement operation, in a predetermined cycle, of measuring an internal standard solution measurement once or more at least before a potential measurement of a second specimen, and
wherein the potential measurement of the second specimen is continuously executed by the electrolyte measurement unit, and upon determining there is a possibility that a first specimen measured immediately before the second specimen is a high concentration specimen based on a comparison of a first ion concentration measurement range of the first specimen and a second ion concentration measurement range of the second specimen, the measurement operation of the internal standard solution before the potential measurement of the second specimen is changed without changing a duration of the predetermined cycle.

* * * * *